US010509865B2

(12) United States Patent
Hackett et al.

(10) Patent No.: US 10,509,865 B2
(45) Date of Patent: Dec. 17, 2019

(54) DRESS FORM FOR THREE-DIMENSIONAL DRAWING INSIDE VIRTUAL REALITY ENVIRONMENT

(71) Applicant: GOOGLE INC., Mountain View, CA (US)

(72) Inventors: Patrick Ryan Hackett, San Francisco, CA (US); Clayton Woodward Bavor, Jr., Atherton, CA (US); Andrey Doronichev, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 616 days.

(21) Appl. No.: 14/859,167

(22) Filed: Sep. 18, 2015

(65) Prior Publication Data

US 2016/0370971 A1 Dec. 22, 2016

Related U.S. Application Data

(60) Provisional application No. 62/052,338, filed on Sep. 18, 2014.

(51) Int. Cl.
*G06F 3/0481* (2013.01)
*G06F 17/50* (2006.01)
(Continued)

(52) U.S. Cl.
CPC ............ *G06F 17/50* (2013.01); *G06T 11/001* (2013.01); *G06T 13/20* (2013.01); *G06T 17/00* (2013.01);
(Continued)

(58) Field of Classification Search
CPC ...... G06T 2210/16; G06T 17/00; G06T 19/00; G06T 13/40; G06F 3/04815; G06F 3/014
See application file for complete search history.

(56) References Cited

U.S. PATENT DOCUMENTS 6,137,500 A 10/2000 Silverbrook et al.
6,222,465 B1 4/2001 Kumar et al.
(Continued)

FOREIGN PATENT DOCUMENTS

CA 2289413 A1 * 5/2001 ............ G06T 19/00
JP 2000003376 A 1/2000
(Continued)

OTHER PUBLICATIONS

Flaherty, Joe. "An Oculus Rift Hack That Lets You Draw In 3-D", Apr. 2, 2014 (Year: 2014).*
(Continued)

*Primary Examiner* — Namitha Pillai
(74) *Attorney, Agent, or Firm* — Brake Hughes Bellermann LLP

(57) ABSTRACT

Systems and methods are described for producing a representation of a display of a three-dimensional virtual reality environment and defining a dress form object within the virtual reality environment. The virtual reality environment is configured to receive interactive commands from at least one input device coupled to a computing device and associated with a user. Fabric movement simulations are generated by animating the dress form object according to configured animation data and displayed in the virtual reality environment. The display being may be generated in response to receiving a movement pattern indicating movement of the dress form object.

20 Claims, 10 Drawing Sheets

(51) Int. Cl.
*G06T 17/00* (2006.01)
*G06T 19/20* (2011.01)
*G06T 13/20* (2011.01)
*G06T 11/00* (2006.01)

(52) U.S. Cl.
CPC .......... *G06T 19/20* (2013.01); *G06F 2217/32* (2013.01); *G06T 2210/16* (2013.01); *G06T 2219/2012* (2013.01); *G06T 2219/2021* (2013.01)

(56) References Cited

U.S. PATENT DOCUMENTS

| | | | |
|---|---|---|---|
| 7,409,259 B2* | 8/2008 | Reyes Moreno | A41H 3/007 345/419 |
| 8,606,645 B1 | 12/2013 | Applefeld et al. | |
| 2002/0021297 A1* | 2/2002 | Weaver | A41H 3/007 345/420 |
| 2004/0189675 A1 | 9/2004 | Pretlove et al. | |
| 2005/0154487 A1 | 7/2005 | Wang | |
| 2014/0176565 A1 | 6/2014 | Adeyoola et al. | |
| 2015/0106241 A1* | 4/2015 | Lucido | G06Q 30/0643 705/27.2 |
| 2015/0316579 A1 | 11/2015 | Pakzad et al. | |
| 2016/0180419 A1* | 6/2016 | Adeyoola | G06L 19/006 705/26.25 |

FOREIGN PATENT DOCUMENTS

| | | |
|---|---|---|
| JP | 2006512486 A | 4/2006 |
| JP | 2006215146 A | 8/2006 |
| JP | 2010061477 A | 3/2010 |
| JP | 2013520729 A | 6/2013 |
| KR | 20010079421 A | 8/2001 |
| KR | 20030039970 A | 5/2003 |
| WO | 2012110828 A1 | 8/2012 |

OTHER PUBLICATIONS

MoreCrayons, "Web-Smart Palette", Sep. 4, 2014.*
Keefe, et al., "CavePainting: A Fully Immersive 3D Artistic Medium and Interactive Experience", I3D, 2001, pp. 85-93.
International Search Report and Written Opinion received for PCT Patent Application No. PCT/US2016/051463, dated Jan. 11, 2017, 22 pages.
Lien, "Media Molecule demoes digital sculpting, puppetry with PS4 and Move controller", Ploygon, (http://www.polygon.com/2013/2/20/4007116/media-molecule-playstation-4-move), Feb. 20, 2013, 1 page.
Invitation to Pay Additional Fees and Partial Search Report received for PCT Patent Application No. PCT/US2016/051463, dated Nov. 17, 2016, 13 pages.
Bourguignon et al., "Drawing for Illustration and Annotation in 3D", Eurographics, vol. 20, No. 3, 2001, 9 pages.
Jiang et al., "An Automatic Matching Scheme between 2D Digital Sketches and 3D Template-Models for Virtual Garment Design", 4th International Congress on Image and Signal Processing, 2011, pp. 1334-1338.
Pham, Binh, "Expressive Brush Strokes", Graphical Models and Image Processing, vol. 53, No. 1, Jan. 1991, pp. 1-6.
Yasseen et al., "Sketch-Based Garment Design with Quad Meshes", Computer-Aided Design, vol. 45, 2013, pp. 562-567.
Office Action with English translation for Korean Application No. 10-2017-7031375, dated Nov. 21, 2018, 12 pages.
Japanese Notice of Grant, dated May 7, 2019, 3 pages.

* cited by examiner

DRESS FORM FOR THREE-DIMENSIONAL DRAWING INSIDE VIRTUAL REALITY ENVIRONMENT

CROSS REFERENCE TO RELATED APPLICATION

This application claims the benefit of U.S. Provisional Application No. 62/052,338, filed Sep. 18, 2014, the entire contents of which are incorporated by reference.

TECHNICAL FIELD

This description generally relates to the field of computer software and more specifically to the field of drawing inside virtual reality computer software.

BACKGROUND

Using conventional computer software can result in difficulties when attempting to create a drawing while in a virtual reality environment. In addition, conventional Graphical User Interfaces (GUIs) generally do not translate well into a virtual reality environment. Virtual reality environments are built in three dimensions, but conventional GUIs are typically built for two-dimensional screens.

SUMMARY

In one general aspect, a computer-implemented method includes producing a representation of a display of a three-dimensional virtual reality environment and defining a dress form object within the virtual reality environment. The virtual reality environment is configured to receive interactive commands from at least one input device coupled to a computing device and associated with a user. The method also includes displaying, in the display, the dress form object and a plurality of toolsets in the virtual reality environment. The plurality of toolsets are configured to generate virtual three-dimensional geometric content on the dress form object. The method additionally includes receiving a plurality of selections in at least one of the plurality of toolsets, the plurality of selections including at least a hue, a fabric, and a brushstroke pattern. In response to receiving a plurality of movement patterns from an input feed of the at least one input device the method can include generating three-dimensional geometric content according to the plurality of movement patterns and the selections, and displaying the geometric content in the display and on the dress form object. The method also includes configuring animation data for the geometric content on the dress form object, the animation data being adapted to simulate properties of the fabric to move the geometric content and simulating fabric movement by animating the dress form object according to the configured animation data and displaying the simulation in the virtual reality environment. The display is generated in response to receiving an additional movement pattern indicating movement of the dress form object. Other embodiments of this aspect include corresponding computer systems, apparatus, and computer programs recorded on one or more computer storage devices, each configured to perform the actions of the methods.

Example implementations may include one or more of the following features. The three-dimensional geometric content includes lines and shapes representing at least a portion of a fashion garment. In some implementations, the hue, the fabric, and the brushstroke pattern are used to generate and output the geometric content on the dress form object.

In some implementations, the three-dimensional drawing plane is configured to be a planar drawing guide for receiving drawings. The planar drawing guide can be fitted to a plane of the dress form object or a plane near the dress form object. The plane may be rotatable on at least three axes and adjustable on or around the dress form object.

In some implementations, the properties of the fabric include fabric weight, fabric drape, and fabric shear recovery. Simulating fabric movement includes obtaining fabric weight information associated with a user-selected fabric and obtaining, from the at least one input device, user movement direction and force associated with the dress form object. Simulating fabric movement also includes moving at least a portion of the fabric at a speed based on the fabric weight and the force, the moving being in a first direction in response to determining the dress form object is moving in a second and opposite direction.

In some implementations, the method includes providing a network interface for multiple computing devices to participate in the virtual reality environment shared by the multiple computing devices. Providing the network interface includes enabling multiple users each using one or more uniquely identified input devices to collaborate in the virtual reality environment with the dress form object to collaborate modifications to the geometric content.

In some implementations, the method includes generating a set of selectable dress form objects for use in the virtual reality environment. The dress form objects are configurable to measurements associated with human anatomy.

In a second general aspect, a system is described that includes a three-dimensional virtual reality drawing environment defining at least one dress form object within the environment. The environment is configured to receive interactive commands from at least one input device coupled to a computing device and associated with a user. The system also includes a movement tracking module configured to detect location information pertaining to a plurality of user movements associated with the at least one input device used to interface with the virtual reality environment, simulate fabric movement based on a plurality of fabric properties and in response to the plurality of user movements.

The system also includes a plurality of three-dimensional tool palettes configured to provide, in the virtual reality environment, a plurality of fabric swatches, a plurality of drawing patterns, and at least one color palette menu represented as a three-dimensional cube including a two dimensional saturation area including a cross section of spaces representing an intensity for a plurality of hues. The intensity defines a degree to which each hue differs from white. The menu also includes a one-dimensional hue area including a plurality of selectable hues that when selected, automatically adjust the two dimensional saturation area to reflect a position of at least one selected hue in the three-dimensional cube.

Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
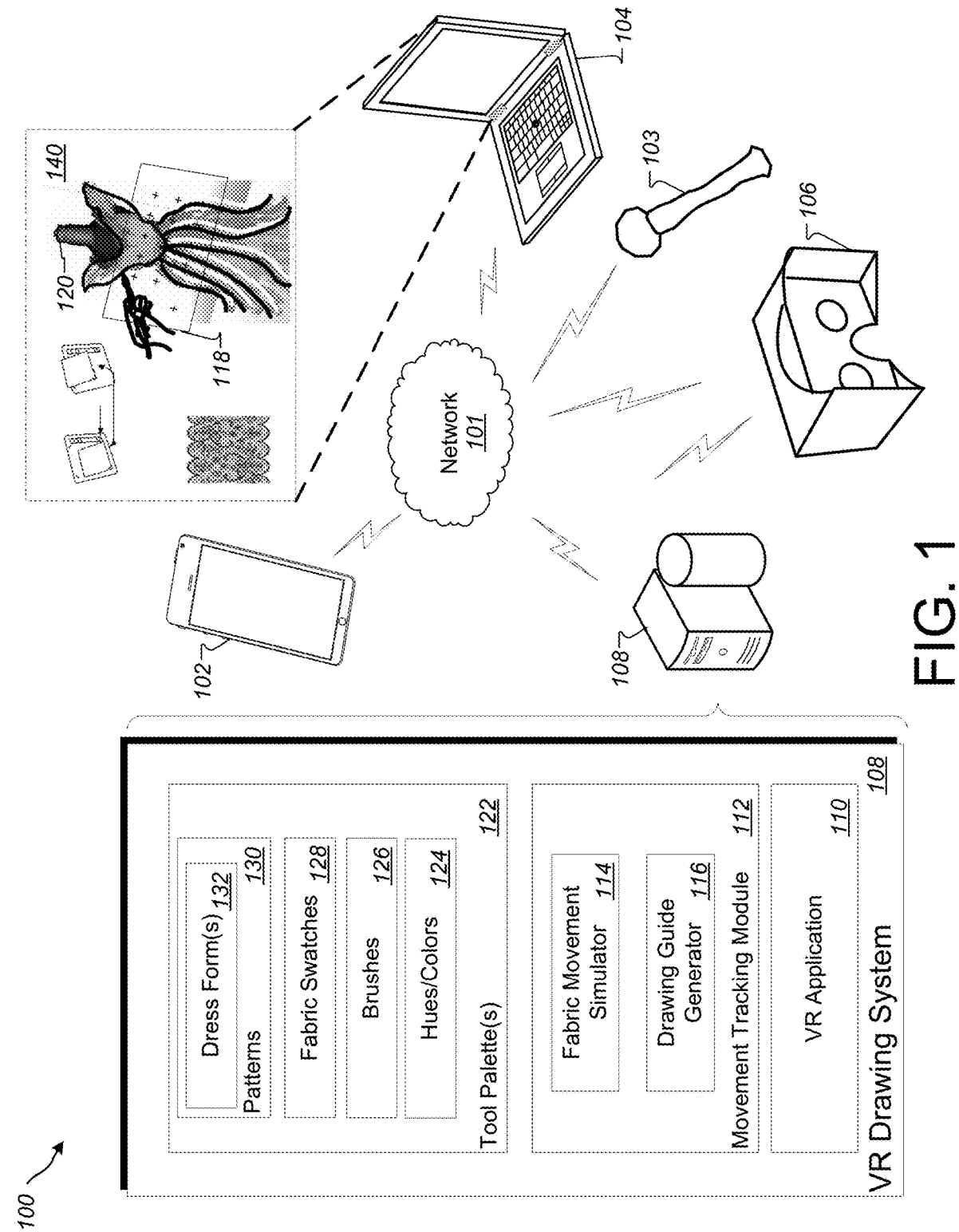
FIG. 1 is a block diagram of an example system for providing a three-dimensional virtual reality environment (e.g., a VR space) in which a user can generate three-dimensional drawings on a dress form figure.

This disclosure describes a variety of systems and methods for generating an environment in which to create a three-dimensional drawing inside a virtual reality environment (i.e., a VR space). A user can access the VR space and begin to create artistic content by drawing (e.g., painting) freeform content on system-generated objects. In particular, the systems and methods described herein can provide fashion forms or dress forms within the VR space in which to guide the user in generating fashion-related drawing content. Fashion-related drawing content can include geometric lines and shapes drawn in the VR space to emulate a fashion design sketchbook, for example. In some implementations, fashion-related drawing content may pertain to clothing (e.g., shirts, trousers, dresses, skirts, capes, vests, etc.) and accessories (e.g., handbags, jewelry, shoes, scarves, belts, hosiery, hats, gloves, sunglasses, glasses, etc.). The dress forms may be provided in the VR space as three-dimensional virtual objects that can function to spark the imagination of an artist (e.g., fashion designer) and motivate the artist to create images of designs for particular fashion items and clothing. The dress forms can be rotated and/or moved around in the VR space to provide the user with an immersive design experience.

The VR space described below can include a number of toolsets (e.g., tool palettes) that include brushes, fabric swatches, colors (e.g., hues), patterns, cursors, panels, canvas simulators, shapes, surfaces, texturizers, or other selectable tools and templates used to generate drawing content on the dress form objects described herein.

The dress form objects described throughout this disclosure can be generated in three dimensions and can be movable about multiple axes, for example, in response to user movements or requests. The multiple axes can provide for rotation or tilt about a 3D drawing plane. The 3D drawing plane may be configured to be a planar drawing guide fitted to the dress form in a two dimension (2D) graphic that is rotatable on at least three axes. The user may use the planar drawing guide to draw in the plane defined by the guide. If the user wishes to add further dimension to drawing content depicted on the dress form object, the user can tilt or rotate the planar drawing guide to begin drawing new content on the dress form object, while leaving prior drawing content in tact and visible in the plane or planes used to generate the prior drawing content.

In some implementations, the tool palettes can include mechanisms to import preexisting files containing 2D or 3D objects including, but not limited to images representing data, art, photographs, models, and/or augmented reality content. In one non-limiting example, a user may annotate portions of the VR space by accessing one or more tools to import images of objects. The tools in the tool palettes may be used to add content or modify images by drawing, drafting, painting, scribbling, moving, illuminating or shadowing, or otherwise generating and manipulating portions of the images in the VR space. The initially uploaded images and user-modified images can be manipulated around two or more axes during and after application of any applied modifications or annotations. In addition, such images can be shared with other users for review and/or collaboration in original or modified/annotated form. In some implementations, the VR space can be used by multiple users to collaborate and to annotate dress form objects in real time.

Particular implementations described in this disclosure may enable a user to draw in three dimensions in the VR space. The user can generate beginning and ending points, for example, by drawing in the air to control a cursor associated with a controller, sensor, or a motion trackable device. In one non-limiting example, the user can point and direct an input device such that portions or objects in the VR space can be drawn upon (e.g., with brush strokes, other objects, annotations, texturizers, etc.).

The systems described below can track the drawing motions of the user, generate artistic or annotated content based on those motions, and provide for moving around the content, the x-y plane or y-z plane (or other coordinate system) that the content is being generated in. For example, the user can lift the motion tracked device into the VR space (which can show the user her hands via the HMD device). The user can begin to draw/paint on a selected surface normal (oriented in 3D space). In another example, if the user begins to draw a circle surrounding her body, the circle will appear from the motion tracked device as the user begins to draw the circle. The motion tracked device may be shown to the user as a paintbrush, pen, controller, or other selected tool in the VR space. Upon completing any portion of her drawing, the user can tilt the plane/surface normal to begin drawing in another vector space (e.g., another dimension or drawing plane). In one example, the user can add a number of fabric swatches to a dress form object to generate a skirt on the dress form object. The user can then move the dress form object or move around the dress form object to view aspects of the skirt, including, but not limited to, fabric movement, shadows and light generated by the fabric, and the overall drape of the skirt. The user can also add additional drawings, details, or content to the skirt by tilting/moving the dress form object.

In some implementations, the systems and methods described in this disclosure can provide for importing objects into the VR space. For example, a user can upload objects into a system hosting a VR application. The VR application can provide the objects for display in the VR space. In one example, users can upload a dress form object configured with particular body measurements. Such measurements can be used to represent the user as a realistic dress form object with accurate figure measurements.

In general, the display in the VR space can be viewed by a user accessing an HMD device. Imported objects can be used to provide a visual reference for a user beginning to draw in three-dimensions within the VR space. The objects can be traced, or in some implementations, can be used as a guide in which the user can judge distances and shapes for recreating a drawing or other notation for the object. In some implementations, the user can draw on the imported object to annotate portions of the object. In some implementations, the user can modify the object by shrinking, growing, elongating, moving, turning, tilting, or otherwise manipulating the object and properties associated with object. In some implementations, the imported objects may be 2D or 3D and can include 3D models, scans, mesh models, depth collages, etc. Imported images can include any displayable file type including, but not limited to a CAD file, a jpeg file, a png, a bitmap file, or other file type. In some implementations, the user can export images generated, modified, or otherwise changed within the VR space.

In some implementations, the user/artist can utilize the systems and methods described in this disclosure as a sketchpad in which to draw fashion-related drawings using selectable fabrics, color palettes, patterns, and brushes/drawing tools. The generated drawings can be animated, shared, printed, modified, and otherwise digitally accessed at a later time.

Generating an environment in which a user can create three-dimensional drawings can include methods for controlling three-dimensional objects and content while inside a VR space, color representation and selection while inside the VR space, generating graphical user interfaces, sequencing frames for animation, augmenting existing three-dimensional virtual objects, representing a user's body while in a VR space, and collaborating amongst users and spectating while inside a VR space.

In a non-limiting example, a user can view sample sketches, draw content/sketches, and import or export sketches from or to an animated .gif. Example controls may include using a keyboard, a mouse, a 3D controller, or any combination thereof, to move a pointer. The pointer may represent an area under a sketch tool depicted in the VR space. For example, the pointer may represent an area in which a sketch is being generated. Example mouse motions can include using a left mouse click to draw, using a middle mouse click to pan along a VR space x-y plane, using a right mouse click to pan along world z-axis, and using a double click middle mouse button to reset the pointer to the center of a sketching surface.

Example keyboard keys that can control content in the VR space include holding the control key to rotate the sketching surface, holding the control key and left mouse button to rotate the sketching surface along a roll axis, holding the shift key to lock the sketching surface to a camera, using the caps lock key to toggle grid locked mode on the sketching surface, holding the tab key to adjust a brush size, pressing a spacebar to reset the sketching surface to the center of scene, double tapping the control key to reset the sketching surface orientation, selecting the (z) key to undo a stroke or action, pressing the (x) key to redo a stroke or action. Such controls can also be configured to translate a surface or object in the VR space while the particular surface or object is locked.

In addition, the systems and methods described herein can be configured to detect and react to movements such as head tilt behavior and/or eye gaze behavior associated with a user and an HMD device being worn by the user. The systems and methods can be used to detect and react accordingly to particular tool palettes and dress forms generated for drawing geometric content in 3D space.

FIG. 1 is a block diagram of an example system 100 for providing a three-dimensional virtual reality environment (e.g., a VR space) in which a user can generate three-dimensional drawings on a dress form figure.

In general, the system 100 may provide the 3D VR space, drawing tools/palettes, objects (e.g., dress form objects) and VR content for a user to access, view, and interact with using the methods, components, and techniques described herein. In particular, system 100 can provide the user with options for accessing the images, content, virtual objects, and VR controls using eye gaze, hand gestures, head movements, and/or other user-based movements within the VR space. For example, a user can generate 3D drawings in portions of the VR space and interact with such drawings using 2D and 3D input devices, and tools configured to generate artistic drawings or annotations on drawings or other VR objects.

As shown in FIG. 1, the example system 100 includes a plurality of computing devices that can exchange data over a network 101. The devices may represent clients or servers and can communicate via network 101, or other network. The client devices may include a mobile device, an electronic tablet, a laptop, a camera, a game controller, VR glasses or HMD device, or other such electronic device that may be used to access VR content.

The example system 100 includes a mobile device 102, a game controller 103, a laptop computing device 104, head mounted display (HMD) device 106, and VR drawing system 108. Devices 102, 103, 104, and 106 may represent client devices. Mobile device 102, game controller 103, laptop 104, and HMD device 106 can include one or more processors and one or more memory devices. The devices 102-106 can execute a client operating system and one or more client applications that can access, control, and/or display VR content on a display device included in each respective device. The VR drawing system 108 may represent a server device. In general, VR drawing system 108 may include any number of repositories storing images, objects, content and/or virtual reality software modules that can generate, modify, or execute display of virtual reality scenes and content.

The HMD device 106 may represent a virtual reality headset, glasses, eyepiece, or other wearable device capable of displaying virtual reality content. In operation, the HMD device 106 can execute a VR application 110, which can playback received and/or processed images to a user. In some implementations, the VR application 110 can be hosted by or interfaced with one or more of the devices 102, 103 104, 106, or 108, shown in FIG. 1.

In some implementations, the mobile device 102 can be placed and/or located within the HMD device 106. The mobile device 102 can include a display device that can be used as the screen for the HMD device 106. The mobile device 102 can include hardware and/or software for executing the VR application 110.

Additional devices are possible and such devices may be configured to be substituted for one another. In some implementations, the devices 102, 103, 104, 106, and 108 can be laptop or desktop computers, smartphones, personal digital assistants, portable media players, tablet computers, gaming devices, or other appropriate computing devices that can communicate, using the network 101, with other computing devices or computer systems.

In the example system 100, the VR drawing system 108 can include a VR application 110. The VR application 110 can be configured to execute on or interface to any or all of devices 102, 103, 104, 106, and 108. The HMD device 106 can be connected to device 102, device 103, or device 104 to access VR content on VR drawing system 108, for example. Devices 102-104 can be connected (wired or wirelessly) to HMD device 106, which can provide VR content for display and interactive drawing.

In the event that the HMD device is wirelessly connected to devices 102-104, the connection may include use of one or more of the high-speed wireless communication protocols described herein. In the event that the HMD device 106 is wired to devices 102-104, a wired connection can include a cable with an appropriate connector on either end for plugging into devices 102-104. For example, the cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors. Similarly, the wired connection can include a cable with an appropriate connector on either end for plugging into the HMD device 106 and devices 102-104. For example, the cable can include a Universal Serial Bus (USB) connector on both ends. The USB connectors can be the same USB type connector or the USB connectors can each be a different type of USB connector.

In some implementations, one or more content/drawing servers (e.g., VR drawing system 108) and one or more computer-readable storage devices can communicate with the computing devices 102 or 104 using network 101 to provide VR content and selectable drawing tools to the devices 102-106. In some implementations, the network 101 can be a public communications network (e.g., the Internet, cellular data network, dialup modems over a telephone network) or a private communications network (e.g., private LAN, leased lines). In some implementations, the computing devices 102-108 can communicate with the network 101 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

In some implementations, the mobile device 102 can execute the VR application 110 and provide content and drawing capabilities to a user accessing the VR space. In some implementations, the laptop computing device 104 can execute the VR application 110 and can provide content and drawing capabilities to a user accessing the VR space, as shown by example at graphical user interface 140. The one or more servers and one or more computer-readable storage devices can communicate with the mobile device 102 and/or laptop computing device 104 using the network 101 to provide content and drawing capabilities for display in HMD device 106.

The VR drawing system 108 includes a movement tracking module 112 that can be configured to track user position and motion within the VR space as well as tracking drawing content. For example, the movement tracking module 112 can employ a geometrical concept to determine user movement of input devices to generate drawing content and brush strokes, in particular. The geometrical concept is described as a quad. Quads can be generated and manipulated by a quad generator (not shown). The quad generator may be configured to generate triangular geometries for tracking position information within the virtual reality environment. The position information may correspond to an initial input location and a current input location for the three-dimensional input device. The triangular geometries may be generated each time the three-dimensional input device is moved. The quad generator can generate triangular geometries that are adapted to be combined to generate drawing content in the virtual reality environment. The drawing content can be configured with a user-selected texture, color, fabric, lighting, and/or shading.

Quads can include at least two triangular geometries (i.e., triangles) that can be used to define positional information for the pointer object (e.g., represented as a brush tip or input mechanism position). The triangular geometries include at least two triangles defining a three dimensional starting point for a cursor, represented in the virtual reality environment, and a three-dimensional ending point for the cursor. The positional information can include a beginning pointer location and a current pointer location. As a user moves the pointer object around in 3D space, the system 100 can generate a quad and positional information corresponding to the quad. The normal of one or both of the triangles that define the quad can be used to define a forward vector. That is, the normal of the pointer object represents the normal of a first triangle in the quad. Similarly, the normal of the pointer object in the current position represents the normal of the second triangle. A right vector can be obtained by performing the cross product of the two normals. Each movement the user makes can be used to generate quads, and each quad can be stitched or appended together to generate a smooth brushstroke (e.g., ribbon of color, texture, line drawing, or other object or artifact representing user movement when generating 3D drawing content in the VR space).

The look of a quad can be is defined by the texture, material, color, and shade or luminance. The texture is a property of the material, with the material being unique per brush and functioning to define the behavior the texture may have with respect to lighting in a VR space (e.g., scene). The color of a quad is set per vertex, and defined by the user, as described in detail below. The shade can be applied to the quad using various inputs from the VR space to modify the look of the quad. Inputs that can affect the shade include color, time, audio input, world space position, model space position, and light/luminance values, as described in detail below.

In some implementations, the material as used herein may pertain to fabric and the properties of the fabric (e.g., fabric weight, fabric drape, and fabric shear recovery). The properties can be used to determine the look and movement of particular quads. The movement tracking module 112 includes a fabric movement simulator 114 that can simulate fabric weight, fabric drape, and fabric shear recovery of a fabric in order to simulate realistic 3D movement of the representations of fabric when placed/drawn on the dress form objects described herein. The fabric movement simulator 114 can access a number of fabric databases to access fabric data for application to brushstrokes of fabric that the user can place on or near the dress form object 118 in the VR space. In one example, the fabric movement simulator 114 can simulate fabric movement by obtaining fabric weight information associated with a user-selected fabric. The simulator 114 can then obtain, from the at least one input device associated with a user, (1) user movement direction and (2) force information associated with the dress form objects described herein. The fabric movement simulator 114 can then move at least a portion of the fabric at a speed based on the fabric weight and the force. For example, the simulator 114 can calculate typical forces with respect to user movements, fabric properties, and dress form object movements (e.g., pertaining to time and distance) and can select a threshold level of movement for a particular combination. The simulated movements may be generated and displayed in a first direction in response to determining the dress form object is moving in a second and opposite direction. That is, if the user twists the dress form object to the right, the draped fabric may shift or sway left a particular calculable amount.

In general, the weight of a fabric may pertain to the heaviness, thickness, or sheerness of the fabric. In general, the weight can be indicated by an observed number of folds (e.g., wrinkles) that appear at a stress point in the fabric, when placed, on the dress form object, for example. These folds may be consistently observed when the fabric lies on or off of the dress form. In general, fabric that is heavier in weight may appear to have smaller or fewer wrinkles Fabric that is lighter in weight may appear to have many or larger wrinkles. The fabric movement simulator can simulate the fabric weight upon moving the dress form with particular fabric placed upon it. For example, the X can simulate heavy fabric by slightly swaying the fabric in an opposite direction of a moving dress form, for example, in response to a user turning the dress form. Similarly, the X can simulate light fabric by rapidly swaying the fabric in an opposite direction of a moving dress form, for example, in response to a user turning the dress form.

The drape of a fabric may pertain to the way a fabric hangs under its own weight. The drape of a fabric is depicted when the fabric is placed on a person or dress form, whether in swatches or clothing. Knitted fabrics may be relatively floppy and garments made from them may tend to follow body or dress form contours. Woven fabrics may be relatively stiff when compared to knitted fabrics so that they are used in tailored clothing in which the fabric hangs away from the body or dress form and may tend to disguise contours. Fabric drape is typically related to mechanical properties associated with the fabric, including, but not limited to bending, shear, formability, fabric weight, and thickness.

The shear recovery of a fabric can be determined by analyzing stress-strain curves for the fabric. If a fabric is deformed at low levels of strain, for example, the shear stiffness may be initially large and may decrease with increasing strain. The fabric movement simulator 114 can simulate particular shear stresses and recovery for a fabric in order to depict realistic movement when particular representations of fabrics are drawn on the dress form objects described herein. For example, the fabric movement simulator 114 may simulate the shear behavior of a particular fabric, according to a weight, a drape, and/or a tension set by the user when attaching the fabric to the dress form objects described herein.

As shown in FIG. 1, the movement tracking module 112 also includes a drawing guide generator 116 configured to generate planar drawing guides, such as planar drawing guide 118 fitted to the dress form object 120 in a two dimension (2D) graphic that is rotatable on at least three axes. The user can draw in the plane defined by the planar drawing guide 118. If the user wishes to add further dimension to drawing content depicted on the dress form object 120, the user can tilt or rotate the planar drawing guide 118 to begin drawing new content on the dress form object 120, while leaving prior drawing content in tact and visible in the plane or planes used to generate the prior drawing content.

In some implementations, the planar drawing guide 118 may represent a mathematical, 2D, or 3D plane in 3D space. The purpose of the planar drawing guide 118 is to constrain interactions from a user to a subset of the 3D space. The planar drawing guide 118 can provide a 3D view in a way that the user can select at least two dimensions in which to draw. The concept of the planar drawing guide 118 could be generalized to any shape or size within VR space. For example, instead of a rectangular plane, the shape of a planar drawing guide 118 could be a sphere or cube or a complex shape including symmetrical or asymmetrical polygons. The planar drawing guide 118 may limit the range of interaction with the VR space for the ease of the user.

In some implementations, the movement tracking module 112 can include capability for head tracking. For example, the HMD device 106 can determine directions that a user's head is moving. The user can nod, turn, or tilt her head to indicate which tool to select, which panel to access, and/or which other functionality to invoke or revoke.

In some implementations, the movement tracking module 112 may also include capability for gaze tracking Gaze tracking can interface with one or more sensors, computing systems, cameras, and/or controls to detect gaze/eye movement associated with the user while the user is in the VR space. The one or more sensors, computing systems, cameras, and/or controls may be housed in HMD device 106, for example. The gaze tracking can track or monitor the direction of a user's eye gaze (i.e., tracking or monitoring where/which direction the user is looking) In general, gaze tracking may include tracking both the orientation and location of one eye or both eyes with respect to a defined coordinate system.

In operation of VR drawing system 108, the user is in control of an input device (e.g., such as a pointer object in a graphical user interface). When the pointer object is activated, the system 108 can record the pointer object position. As the pointer object moves, the system 108 can measure the difference from a previously recorded pointer object position and generate a new quad in response to the pointer object being moved by the user. The generated new quad may be represent two triangles, with the forward vector defined by the distance between the points, the pointer forward as the quad normal, and the cross product of those two defining the right-hand vector. The width of the quad may be defined by the right-hand vector multiplied by the current brush size, which may be controlled by the user.

In some implementations and for certain brush types, the system 108 can stitch the quads together to create a smooth, ribbon effect. Stitching the quads together may include matching a leading edge of a previous quad with a trailing edge of the current quad. Midpoint mathematical calculations can be used to ensure quad triangles do not fold in on other quad triangles. In addition, if the dot product of the forward vectors of two sequential quads is greater than an amount relative to the vector size multiplied by a scalar, the system 108 can trigger a break of the ribbon, which can begin a new sequence of quads. In some implementations, smoothing algorithms can be applied to the normals of sequential quads to generate a consistent look to the ribbons/brushstrokes.

In some implementations, the system 108 may not stitch the quads together and instead may assign random orientations to a forward vector, which can function to generate a spray paint effect. Such an effect may be associated with particle brushes that can be selected from a brush tool palette. In one example, instead of generating and stitching quads, the system 108 can generate billboard stripes.

As shown in FIG. 1, the VR drawing system 108 also includes tool palettes 122 including, but not limited to hues 124, brushes 126, fabric swatches 128, and patterns 130. The VR application 110 can provide a number of tool palettes 122 within the VR space. Tool palettes 122 may be represented as 2D or 3D interactive menus in the VR space. In one example, tool palettes 122 are 3D objects that can include a number of user-selectable controls or content. The tool palettes 122 may be affixed to content in the VR space or may appear floating in the VR space and at the ready to receive user selections or simply provide visual guidance. In some implementations, the panels may light up to indicate available tools, drawing planes, pointer locations, or other indicators that can trigger head or eye movement from a user.

The tool palettes 122 may include a color panel including hues 124, which may represent a three-dimensional tool palette configured to provide, in a VR space, at least one color palette menu represented as a three-dimensional cube in three-dimensional space. The cube may include a two dimensional saturation area including a cross section of spaces representing intensity for number of different hues 124. The intensity may define a degree to which each hue differs from white. The intensity may be depicted numerically, graphically, textually, or both. The cube also includes one-dimensional hue area including selectable hues. Upon selection of one of the hues, the color panel may automatically adjust the two dimensional saturation area to reflect a position of at least one of the selected hues in the three-dimensional cube.

The tool palettes 122 include brushes 126. Brushes 126 can apply to any tool used to generate drawings, objects, and/or content in the VR application 110. A brush may be defined by the material and shader associated with the brush. The material can optionally contain a texturizing aspect that applies particular textured representations of the material. The brush color is generally selected by a user.

The following tables describe a number of brush panel and drawing panel options and effects that can be accessed in the VR space using the point to select a brush or adjust a brush size.

TABLE 1

Brush Panel Options

| Brush Panel | Effect |
|---|---|
| Ink | Textured lines that always face the camera |
| Streaky Ink | Textured lines that always face the camera |
| Pencil | Thin lines that always face the camera |
| Additive Ink | Textured lines that always face the camera, using additive color properties |
| Flat Brush | Flat, oriented paint quads |
| Coarse Brush | Textured, oriented paint quads |
| Splatter Brush | Textured, oriented paint quads |
| Square Brush | Flat, oriented paint quads |
| Star Brush | Creates star particles |
| Smoke Brush | Creates smoke particles |
| Shrapnel Brush | Creates sharp, angular particles |
| Light Brush | Flat lines that always face the camera and emit light |

TABLE 2

Drawing Options Panel

| Drawing Options Panel | Response |
|---|---|
| New Sketch | Clears scene |
| Sample Sketch 1 | Test scenes to show example sketches |
| Sample Sketch 2 | |
| Sample Sketch 3 | |
| Scene Lights | Use two directional lights for shadow casting |
| Ambient Lights | Use only flag, white ambient light |
| No Lights | Disables lighting to highlight Light Brush strokes |
| Unlocked Rotation | Free rotation with Ctrl key |
| Yaw Only Rotation | Rotation is locked to the Yaw axis on the Sketching Surface |
| Pitch Only Rotation | Rotation is locked to the Pitch axis on the Sketching Surface |
| Roll Only Rotation | Rotation is locked to the Roll axis on the Sketching Surface |
| Undo | Undoes last brush mark |
| Redo | Redoes last undone brush mark. |
| Toggle Grid Lock | Toggles Grid Locked mode on Sketching Surface |
| Auto-Orient | Automatically adjusts the orientation of the sketching surface after a rotation to ensure 'up' on the mouse is 'up' on the Sketching Surface |
| Auto-Gif | Exports an animated .gif file of the current scene. The focal point of the exported .gif is the current center of the Sketching Surface. Animated .gif files are saved in the Gifs folder |

In one example, instead of free-form drawing, a user can select a constraining tool to paint or draw a particular shape. One such example includes a straight edge tool that can be selected to provide a straight line from a beginning to ending point selected by the user and in the selected brush stroke. Another example includes a mirror brush that can be selected to free form mirror a drawing that the user is actively drawing in the VR environment. The mirror brush can mirror such a drawing left to right, top to bottom, or any other 2D or 3D mirroring angle. In addition, the mirror brush can replicate to any number of axes. For example, the mirror brush can be set to mirror across axes such that a 3D mirrored drawing can be replicated across all three axes in 3D. Functionally, the system 100 may be receiving input from a user at a pointer and can mirror the pointer movements across several planes of space in the VR space. The mirroring may be a mathematical reflection across the planes. The mirroring can occur simultaneously to the user generating the drawing.

The tool palettes 122 may include fabric swatches 128 (e.g., fabric painters that can mimic fabric swatches in the VR space). The fabric swatches 128 may include textile options including but not limited to silk, corduroy, cotton, rayon, polyester, wool, leather, fleece, etc. A user can select one or more fabric swatch 128 and draw on a dress form retrieved from dress forms 132, for example. The drawing may be applied in brushstrokes that begin to take on similar visual properties of the selected fabric type. For example, if the user selects a desired fabric from an array of fabric swatches 128 (e.g., images representative of fabric swatches in the VR space), then the drawing can be generated in line or shape form, and can be tiled, or stretched as the user wishes. In some implementations, the user can define fabric swatches by combining one or more fabric swatches or by applying visual effects to particular fabric swatches. For example, the user can add an illumination to a fabric swatch.

The tool palettes 122 may include patterns 130. The patterns 130 may pertain to garment components, accessory components, dress form components, or full garments or accessories. Users can access patterns 130 to select and insert a virtual image of such patterns into the VR space. In some implementations, the patterns can provide guidance to the user to allow the user to draw or sketch on the dress form object 120, for example.

Figure 2:
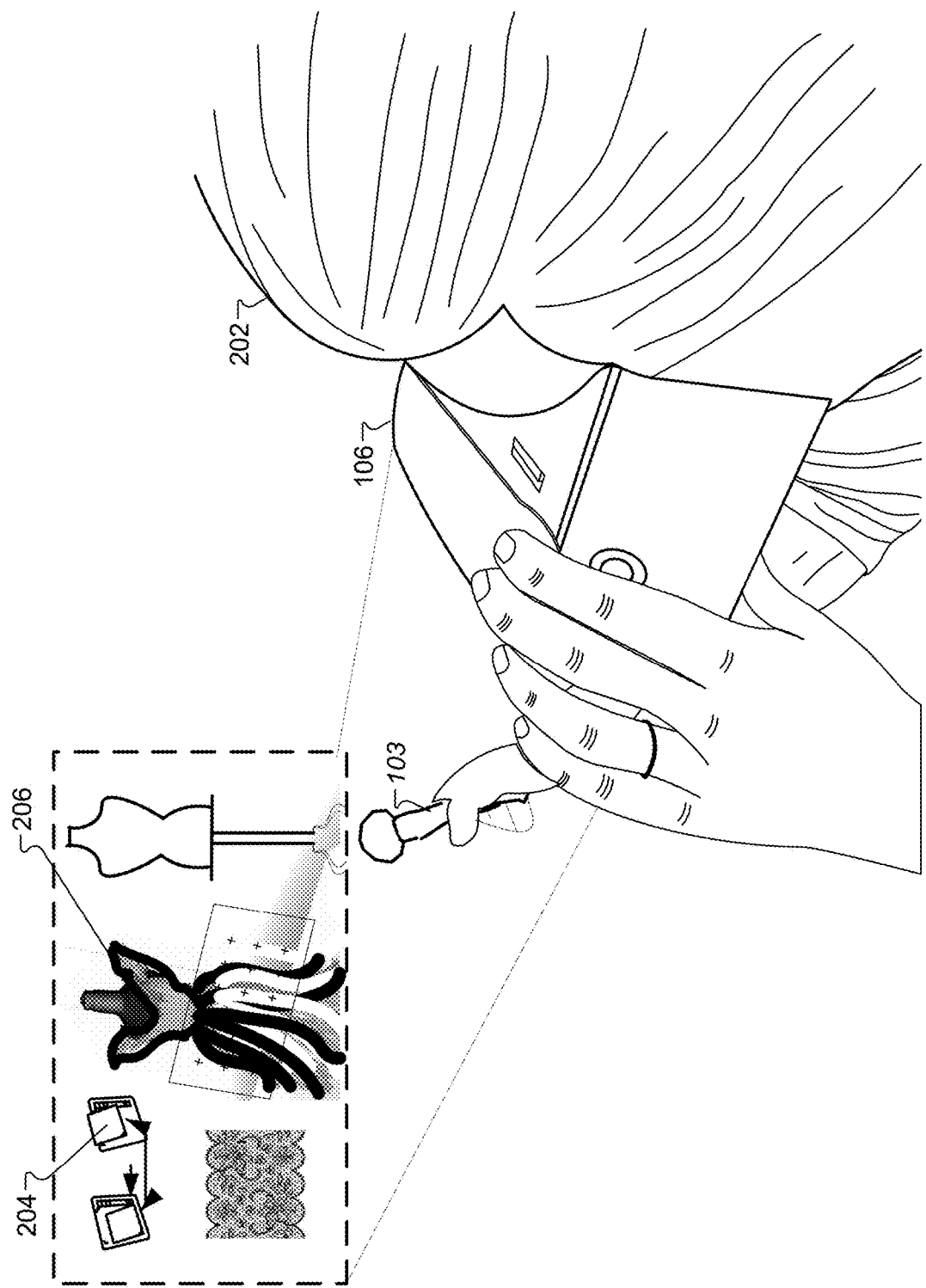
FIG. 2 is a diagram that illustrates a head mounted display (HMD) device accessing VR content with a computing device in the VR space of FIG. 1.

FIG. 2 is a diagram that illustrates an HMD device 106 (or VR device) accessing VR content with a mobile device 102, for example. In the example shown in FIG. 2, a user 202 may be accessing VR drawing system 108 by interfacing with content in system 108 (with controller 103). The user 202 may be accessing a color palette 204 and may be drawing content on a dress form object 206. The image with the color palette 204 and the dress form object 206 is shown as a dotted line figure because the depicted content is provided within the VR space that the user 202 is viewing in HMD 106.

To begin accessing VR drawing system 108 and view panel 206, the user 202 can put on the HMD device 106 by placing the device 106 over the eyes of the user 202. In some implementations, referring to FIG. 1, the HMD device 106 can interface with/connect to mobile device 102 and/or controller 103, for example, using one or more high-speed wired and/or wireless communications protocols (e.g., WiFi, Bluetooth, Bluetooth LE, USB, etc.) or by using an HEMI interface. The connection can provide the content to the HMD device 106 for display to the user on a screen included in the device 106.

One or more sensors can be included on controller 103 and can be triggered, by users accessing device 103 and HMD device 106, to provide input to the VR space. The sensors can include, but are not limited to, a touchscreen, accelerometers, gyroscopes, pressure sensors, biometric sensors, temperature sensors, humidity sensors, and ambient light sensors. The controller 103 can use the sensors to determine an absolute position and/or a detected rotation of the controller 103 in the VR space that can then be used as input to the VR space. For example, the controller 103 may be incorporated into the VR space as a mobile phone, a paintbrush, a pencil or pen, a drawing tool, a controller, a remote, or other object etc. Positioning of the controller 103 by the user when incorporated into the VR space can allow the user to position the mobile phone, paintbrush, pencil or pen, drawing tool, controller, remote, or other object in the VR space.

In some implementations, one or more input devices can be used to access content and provide input to the VR space. The input devices can include, but are not limited to, a touchscreen, a keyboard, one or more buttons, a trackpad, a touchpad, a pointing device, a mouse, a trackball, a joystick, a camera, and a microphone. A user interacting with an input device can cause a particular action to occur in the VR space.

Figure 3A:
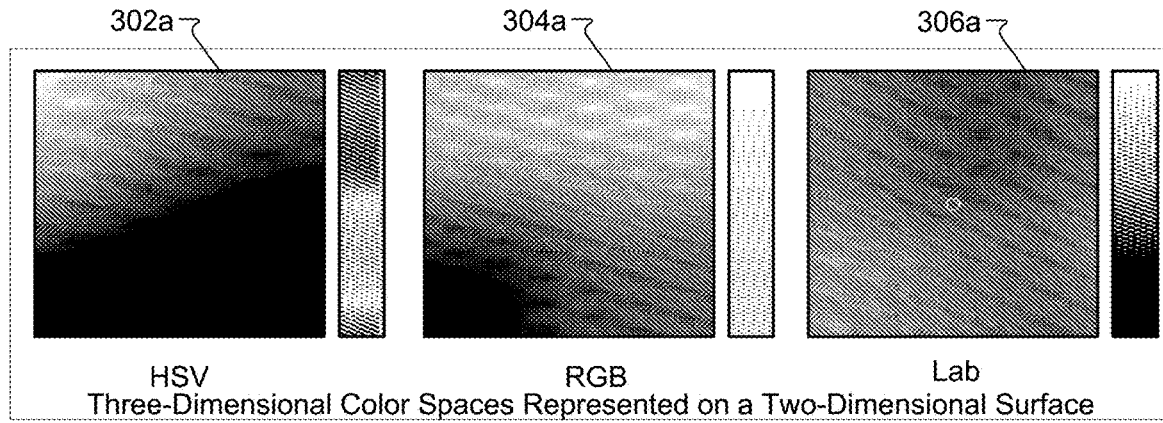
FIGS. 3A-B are examples of various color spaces represented in two and three dimensions.
Figure 3B:
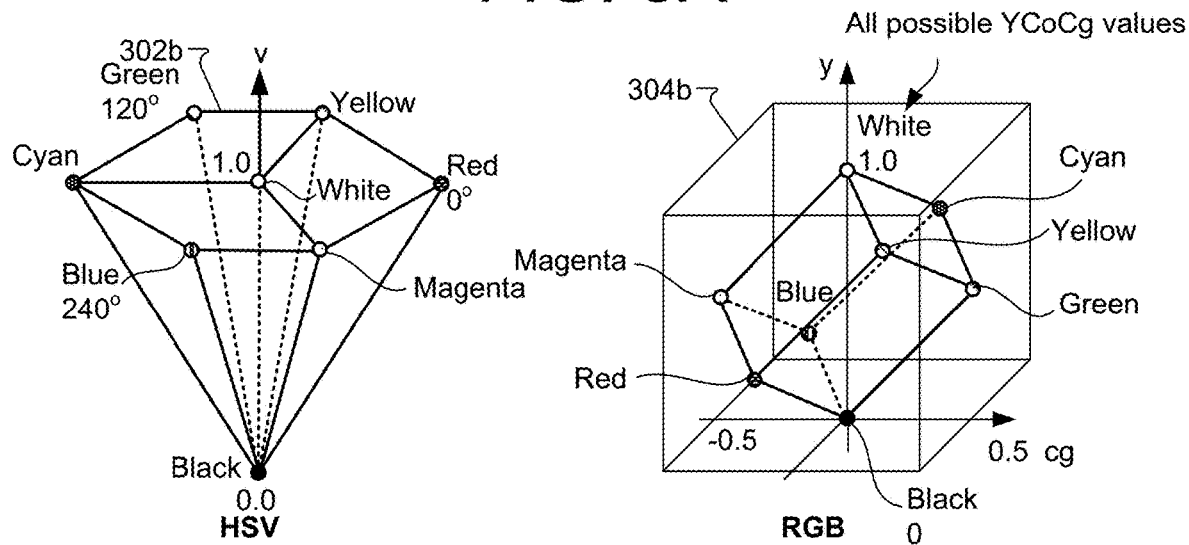

Referring now to FIGS. 3A-3B, three-dimensional color volumes are shown. In general, color is a three dimensional quantity that is traditionally represented on a two dimensional surface. The following description includes a method of representing, and choosing, a color in a 3D VR space by representing that color in 3D.

Color can be a complex concept, and may commonly be reduced to a 3D color space for use in computer graphics. By defining a color space, colors can be identified numerically by particular coordinates. In virtual reality, true 3D color objects can be generated and manipulated.

FIG. 3A depicts color in two dimensions for Hue, Saturation, Value (HSV) color spaces 302a, Red, Green, Blue (RGB) color spaces 304a, and Lab color space 306a. FIG. 3B depicts color in three dimensions for HSV 302b, RGB 304b, and Lab 306b. By rendering these color spaces into the VR space as true 3D objects, the user can comprehend and visualize all accessible colors.

In order to render the color space without obscuring colors inside the volume, users can select a two-dimensional slice by positioning a cross section inside the volume. Colors in front of the slice should not be represented, as they will obscure colors on the cross section. Colors behind the cross section can be rendered with partial, or full, transparency. Any and all colors can be selected to generate drawing content on or near the dress form objects described herein.

Figure 4:
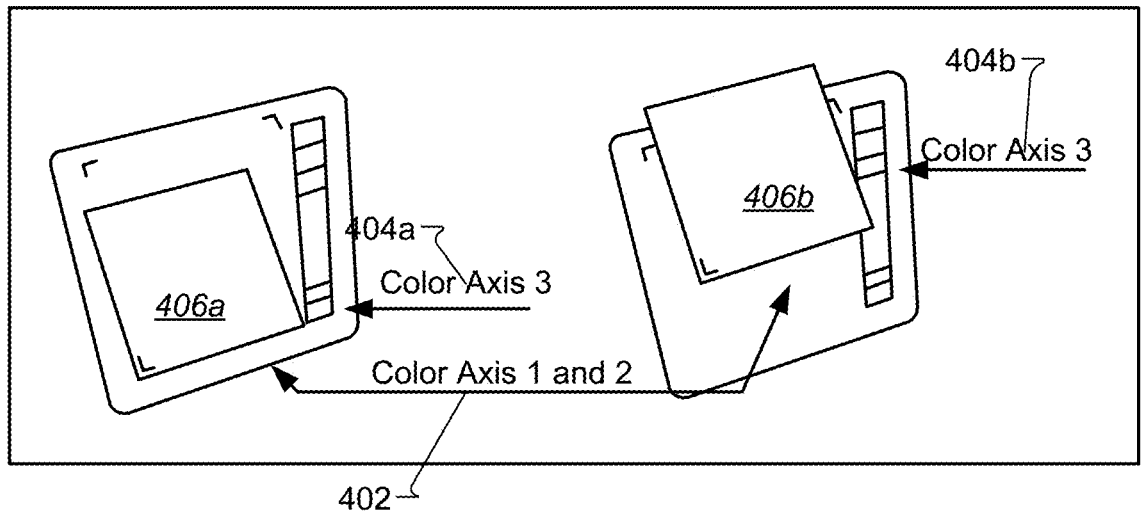
FIG. 4 is a perspective view of an example three-dimensional color picker.

Referring now to FIG. 4, it is shown that one way of positioning the cross section is to define its position as one of the color space axis 402, 404a, and 404b. Manipulating the value of one or more of these axes (402, 404a, 404b) changes the position in 3D space of the cross section from cross section 406a to cross section 406b. The colors on the cross section 406b updates accordingly. A single 2D position on the cross section 406a, combined with the value of that third axis 404a or 404b, fully describes the coordinate of a desired color. The cross section 406b can also be positioned in other ways described above with respect to object control. For example, motion controller or head position can be used to manipulate the cross section.

Figure 5:
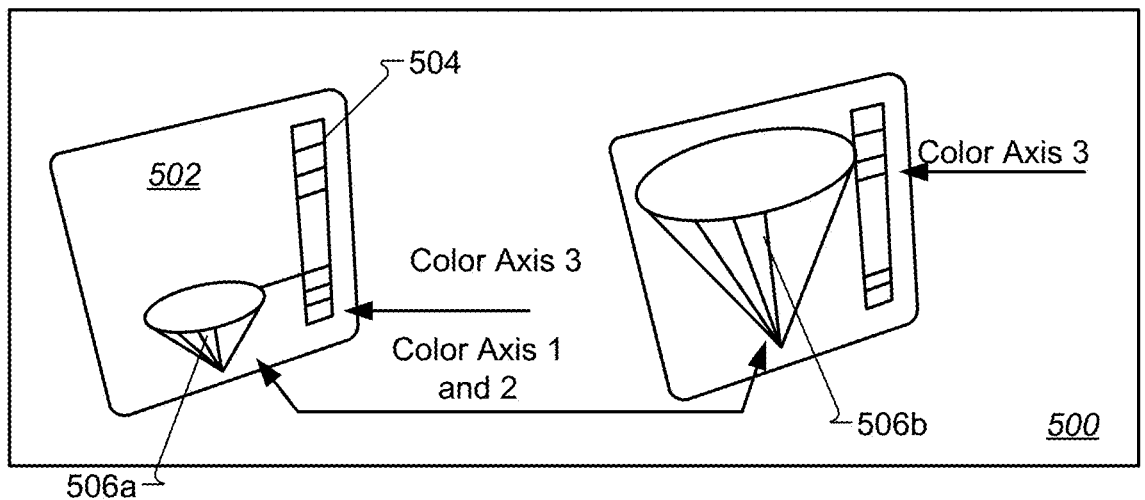
FIG. 5 is an example screenshot of a three-dimensional color picker.

Referring now to FIG. 5, an HSV color picker is shown. It should be noted viewing the color in three-dimensions provides a more accurate view into what colors are available for selection, as the narrowing at the bottom of the cone (as all colors converge on black) is visualized. As shown, a screenshot 500 of a prototype application of a three-dimensional color picker with a color space 502.

In general, the concept of a three dimensional color space, and color picker, can be expanded to contain information more complex than just the three-dimensional color spaces. In this example, colors that are in use in the VR drawing system 108 in the VR space are highlighted allowing users to visualize their color palette in three dimensions. Hues 504 are shown here on the right side of color space 502. The hues range from lightness/bright or lightness and darkness, which can be depicted as a color, shade, or numerical value. Sliding a hue slider (not shown) up and down can cause the color palette 506a to physically cause movement (i.e., virtual movement) in the VR space, as shown by growing color palette 506b.

Color palettes can be depicted in 3D and as a 3D colorbox (e.g., color volume). The palettes may appear 3D to the user and be generated and depicted in the VR space as a cross-sectioned space representing a color selector. In particular, the cross-sectioned space may be represented as a cross-section of a cube that translates according to a user-selectable hue and then the texture on the cross-section updates color according to the position that it is cross-sectioning the cube. A user can select a hue to begin painting a drawing and can reselect additional hues to change colors and begin drawing in the reselected hues, accordingly.

In some implementations, hues may be textures, rather than colors. For example, the quads described above can be generated with a number of textures. Upon generating such quads, a 3D geometry can be applied to the quads as the drawings are generated by a user. Depending on the type of brush the user selects, brightness (e.g., ultraviolet numerical values) can also be applied to the quads. This can allow for drawing light in the 3D VR space. In some implementations, the system 100 can be used to stretch ultraviolet hues from 0 (darkness) to 1 (sunlight brightness) across an entire brushstroke. In some implementations, the system 100 can repeat a swatch of UV from 0 to 1 by resetting the hue to generate a repeating light swatch of quads.

Color may be represented on a cube in triangular form. For example, a bottom left corner of a portion of a cube may be a triangle in which one vortex (triangle tip) is colored one hue, while the remaining portions of the triangle fade to additional hues. The vortex color of the triangles in each quad are shown as a hue/color that the user has selected. In one example, if the user selects a white texture and a blue color, then the vortex may be tinted blue so that a brush stroke painted with such a hue-texture combination can be shown as blue.

In addition to the hue selection, texture selection, brush selection, the system 100 can also allow shader selections which can define reflection values. These reflection values may simulate lighting or shading. The shader value can affect how the texture and hue are represented in the VR space. Use cases for virtual reality color selection for clothes, shoes, makeup, interior design, architecture, product, online product purchasing, 3D printing material selection, and paint chips.

Figure 6:
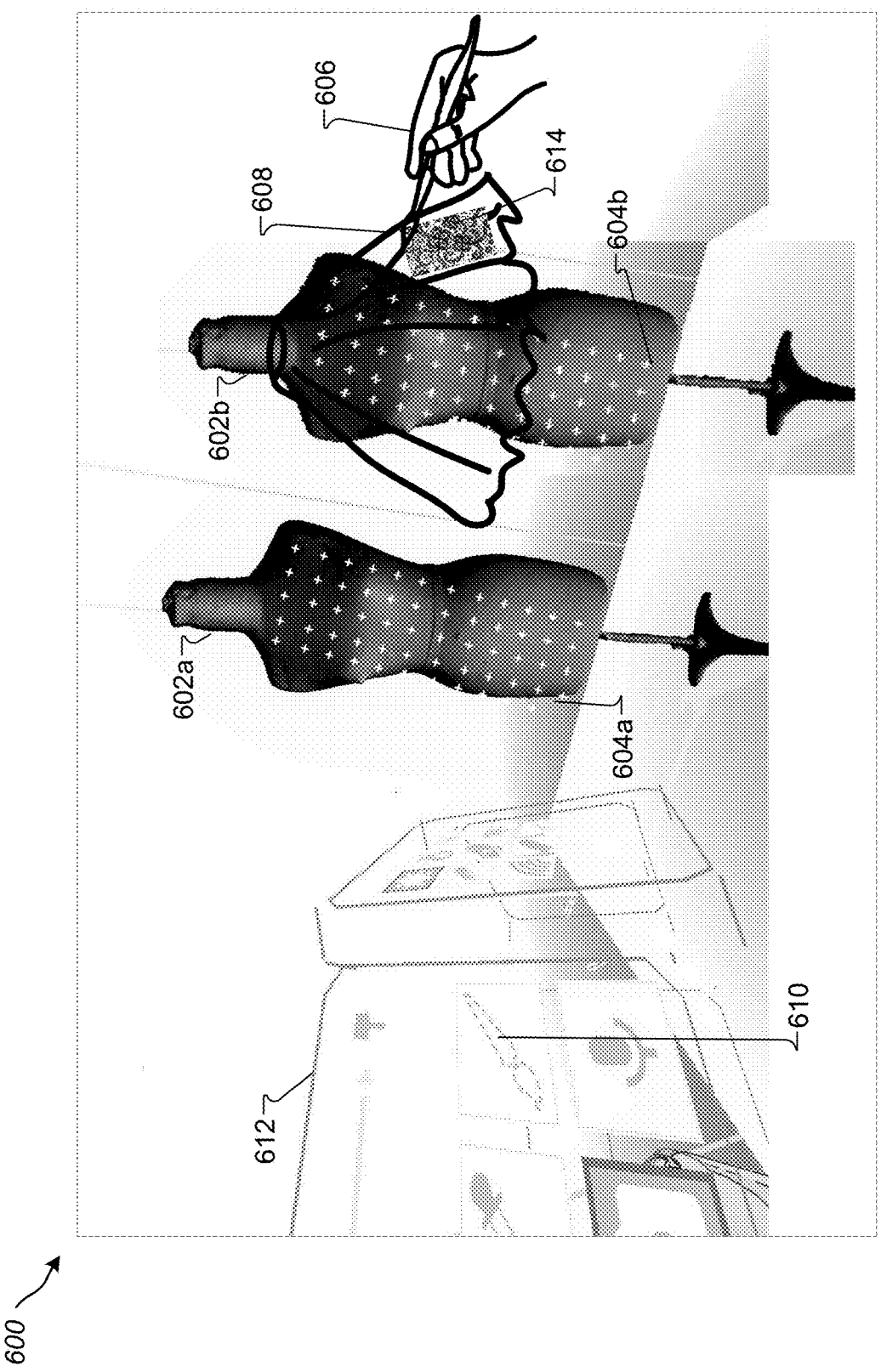
FIG. 6 is an example screenshot of a dress form object depicted in the VR space of FIG. 1.

FIG. 6 is an example screenshot 600 of a dress form object 602a depicted in the VR space of FIG. 1. The dress form object 602a shown here includes a blank canvas that the user can draw upon. A planar drawing guide 604a is shown to guide the user to draw or place content on or near the dress form object 602a in a first plane. Although, not depicted, the planar drawing guide 604a can be tilted on three axes and when tilted, the dress form object 602a may be tilted with the guide. This can enable the user to draw in additional dimensions to add depth to the drawing, for example.

As shown at dress form object 602b, a planar drawing guide 604b may have been used by a user, shown here in the VR space as a hand 606 painting in a cape 608. The user may have selected paintbrush 610 in a tool palette 612 to do so. In addition, the user has selected a lace fabric swatch 614 and has begun to paint/draw the desired fabric on the cape 608.

Figure 3B:
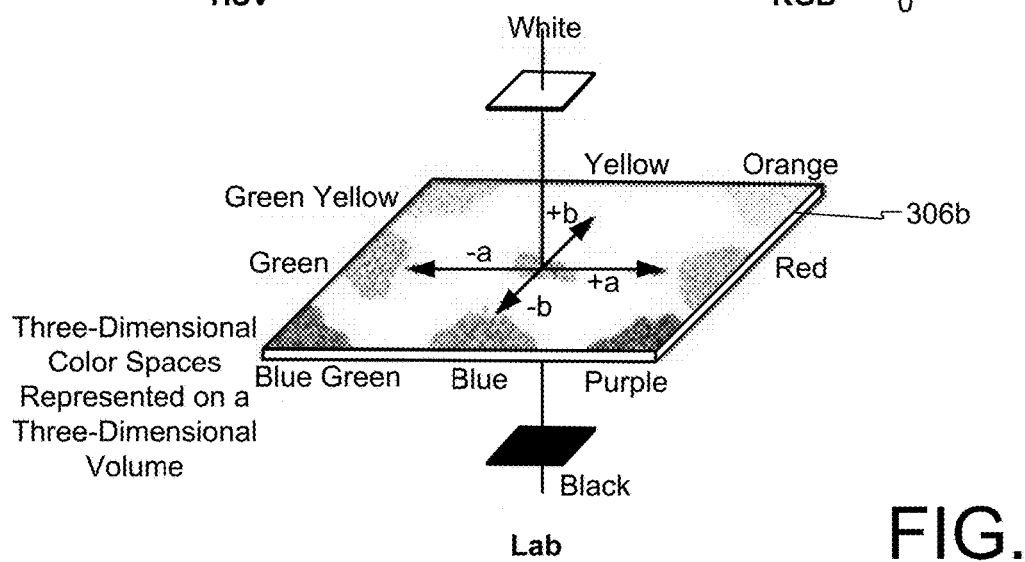

Referring now to the object control with two-dimensional input feature in more detail, in FIG. 3, there is shown an object 302 that is viewable in a VR space 304. FIG. 4 shows the conventional computer keyboard 402 and mouse 404 input mechanisms.

To access toolsets and input drawings, the user may use keys on a keyboard and/or a mouse to cause a visible change on content drawn in and around the dress forms 602a or 602b in the VR space. In operation, using the keyboard and the mouse to draft drawing content can allow movement in three dimensions. Namely, the keyboard represents a 1-dimensional input while the mouse represents a 2-dimensional input. Being that the VR space is 3D, combining the keyboard and mouse can allow for movement in all three dimensions. For example, using the keyboard and mouse, a 2-dimensional drawing/cutting plane can be accessed in the 3D VR space and when a user moves the mouse around, the pointer of the mouse (and a pointer or beginning point for creating drawings in the VR space) can move around on that plane. A drawing can be generated by clicking and dragging the mouse and additional movements and the planar drawing guides (e.g., 604a, 604b) can be accessed by holding down certain keys on the keyboard. In particular, the orientation and position of a particular plane can be manipulated using keystrokes and mouse movement and input.

In a non-limiting example, a user can begin to draw a portion of cape 608 and can rotate (e.g., tilt) the planar drawing guide 604b and then begin to draw or paint additional content, which can appear in the VR space as if the user is generating/drawing/painting two sides/angles of the dress form object 602b. In some implementations, if the user holds a shift key on the keyboard, the planar drawing guide 604b may be locked to the user's head position. In particular, if the user holds the shift key and leans back, the system 100 can bring the planar drawing guide 604b. If the user holds the shift key on the keyboard and turns her head to the left, the planar drawing guide 604b can be adapted to rotate leftward.

At any point during or after completion of drawing, the system 100 can apply animation to any or all of the drawing. For example, the system 100 may configure animations for and then display the lace fabric 614 of the cape 608 moving. The movement may occur in response to the user moving around the object 602b, or in response to the user twisting, moving, turning, or tilting the dress form object 602b.

The user can generate drawings on the dress form objects 602a and 602b using tools, for example, by selecting paintbrush 610. The user can additionally select other items from one or more tool palettes housed in panels 612, including, but not limited to hues 124, fabric swatches 128 (e.g., lace fabric 614), patterns 130, and/or dress forms 132.

Figure 7A:
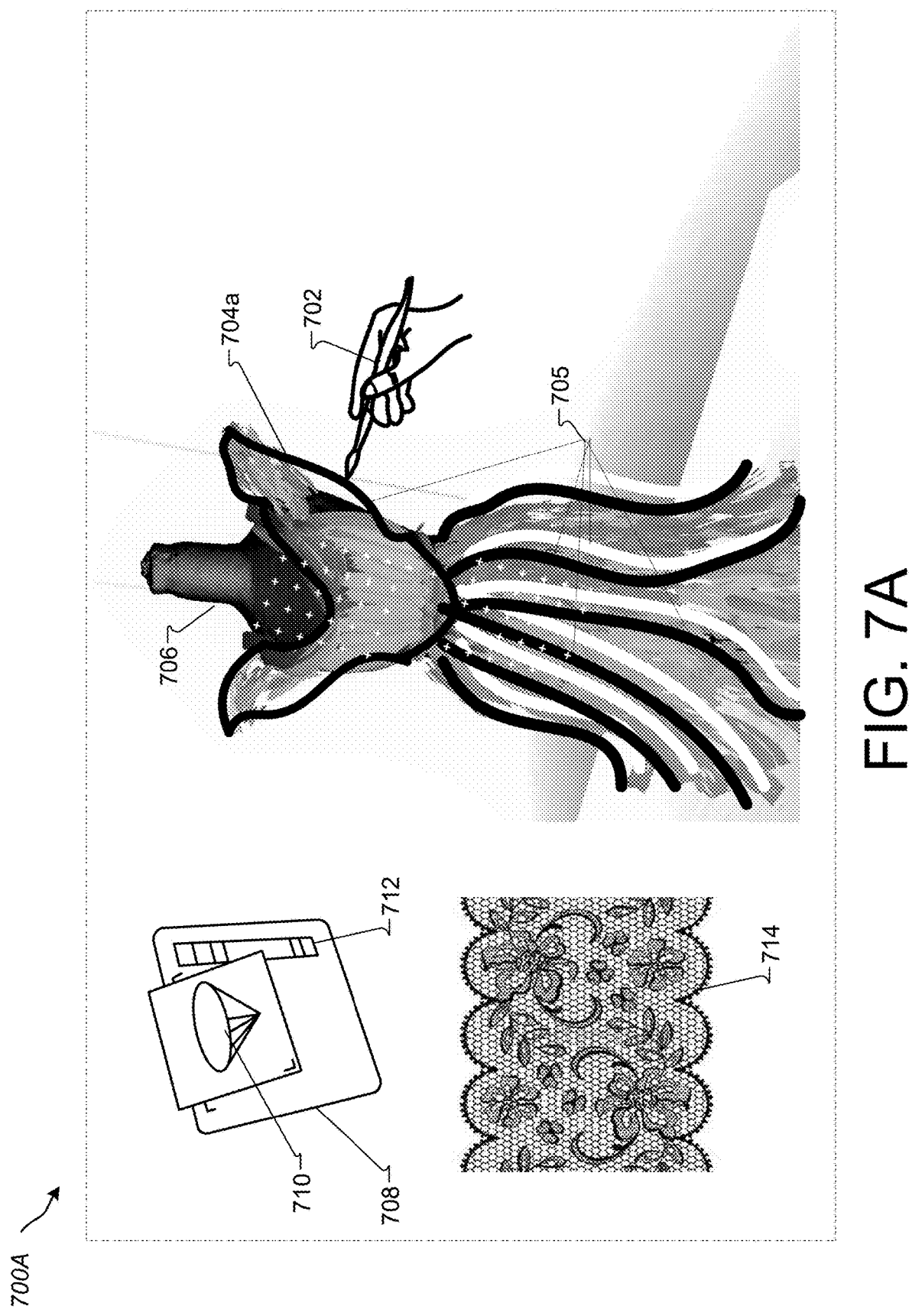
FIGS. 7A-7B are example screenshots of generating drawings on a dress form object using a hue, a pattern, and one or more brushstrokes selected by a user.
Figure 7B:
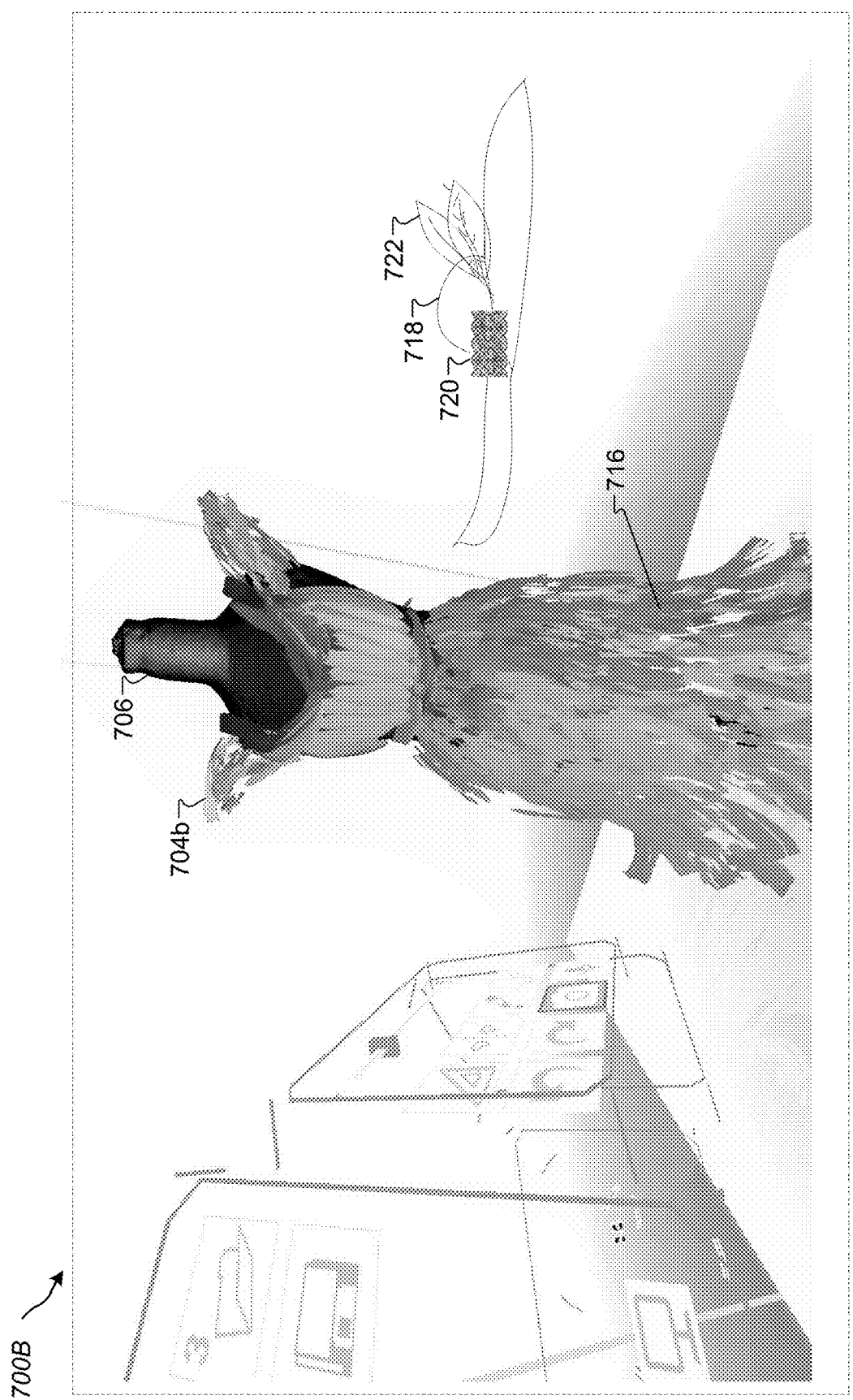

Referring now to FIGS. 7A and 7B, a hue, a pattern, and one or more brushstrokes have been selected by a user. Here, the user (represented by drawing hand 702) is painting a dress 704a on dress form object 706. In this example, the user may have selected several different brushes and hues to generate an initial drawing, shown at least by lines 705. The user may have chosen the brushes and hues from a color tool palette, 708. The color tool palette 708 may represent a portion of a number of accessible three-dimensional tool palettes configured to provide, in the virtual reality environment, a number of selectable fabric swatches, a number of drawing patterns, and a number of hue/color palettes, and/or objects. In this example, the color tool palette 708 may include a menu of colors and/or drawing patterns represented as a three-dimensional cube including a two dimensional saturation area 710, a cross section of spaces 712, representing an intensity for a plurality of hues. The intensity may define a degree to which each hue differs from white. The color tool palette 708 may also include a one-dimensional hue area including a plurality of selectable hues that when selected, automatically adjust the two dimensional saturation area to reflect a position of at least one selected hue in the three-dimensional cube. The drawing patterns may include fashion garment templates for use in the virtual reality drawing environment.

In this example, the user has selected a lace fabric swatch 714, which may or may not be applied with paintbrush 702. For example, the user may have already used the lace fabric swatch (or may use it again in the near future), and as such has locked the swatch to her drawing area in the VR space. This locking can be performed to capture a clipboard of used brushes, hues, or fabrics, for reference or for reselection when generating additional drawing content.

Referring to FIG. 7B, a completed drawing is shown at drawing 704b. Here, the user may have completed her drawing on the dress form object 706 and may have directed the system 100 to merge brush strokes with common fabric, brush, and/or hue selections. For example, brushstrokes 705 (FIG. 7A) are now shown merged into a cohesive fabric 716 in FIG. 7B. The cohesive fabric may have been generated by the system 100 in response to detecting common aspects between side-by-side brushstrokes. In this example, the user has also drawn a hat 718 for the design. The hat 718 includes a lace ribbon 720 generated using the lace fabric swatch 714 and brush 702. The hat also includes feathers 722 that the user may have selected from fabric swatches or alternatively, hand drew on the hat.

Figure 8:
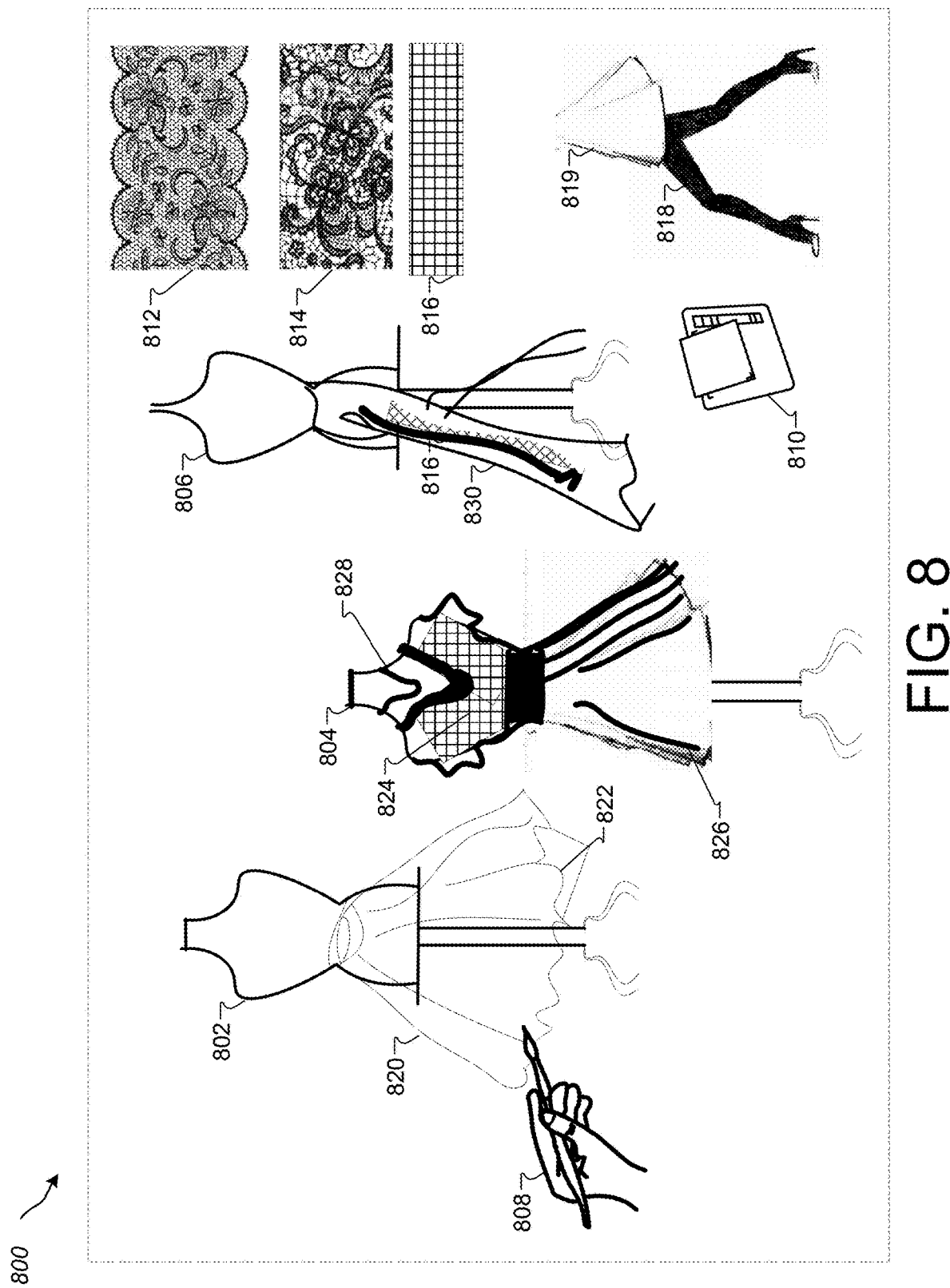
FIG. 8 is an example screenshot of drawings generated in a VR space using multiple dress form figures.

FIG. 8 is an example screenshot 800 of drawings generated in a VR space using multiple dress form objects 802, 804, and 806. In this example, the user (represented in VR space as drawing hand 808) is accessing the VR space with an HMD device. The content and panels shown floating in the drawing space depicts an example of what the user would see when generating content on multiple dress form figures within the VR space. The user can select any number of dress form figures and can begin accessorizing the figures with drawings of accessories, fabric swatches, previously generated drawings, colors, etc.

A tool palette 810 is shown for the user to select hues, for example. Additional fabric swatches are shown at 812, 814, and 816. The fabric swatches may represent user-selected swatches that the user wishes to display with the drawings in screenshot 800. In some implementations, the fabric swatches 812, 814, and 816 may simply provide alternative colors to the colors depicted on the dress form objects 802, 804, or 806.

As shown at dress form object 802, the user 808 is drawing a skirt 820 with ruffles 822. The skirt may be in a flowing fabric that, when animated by system 100 (e.g., fabric movement simulator 114), can simulate actual user wear of the clothing article. The selected fabric includes properties (e.g., shear, drape, and weight properties) that the system 100 can simulate during or after the design process.

As shown at dress form object 804, the user 808 has drawn a tennis shirt 824 and skirt 826. The shirt 824 utilized fabric swatch 816. The user 808 also drew in a necklace 828. Similarly, the user stylized dress form object 806 with trousers 830. The trousers 830 include flowing lines, hand drawn in the VR space with a drawing tool. The trousers 830 include swatch 816 as a possible fabric. Here, the user also generated a set of tights 818 and an overcoat cape 819 as an alternative outerwear in her design. The tights 818 and cape 819 may have been generated in free space or may have been generated on one of the dress form objects and subsequently moved aside in the VR space to make room for another drawing, for example. Although portions of the content depicted in FIG. 8 is shown in a flat 2D plane, the content is indeed 3D. That is, the system 100 can receive two-dimensional line drawings from a user in 3D space and convert the line drawings to 3D. In some implementations, the system 100 can allow the user to create additional dimension to their 2D designs, rather than generate 3D content automatically.

In general, graphical user interfaces (GUIs), such as the screenshot depicted in FIG. 8, are provided in the VR space with a number of interactive panels, tools, and menus. The user can use a two or three-dimensional input device to generate content in GUI of the VR space. The panels, tools, and menus can be activated and deactivated. The drawing planes for any and all of the dress form objects 802-806 can be tilted to draw additional content. Tilting one dress form object may not affect the look or interaction with another dress form object. This is because each VR space can be divided into a number of virtual areas.

In addition to interfacing with and generating drawings in the VR space, a user may wish to share a drawing session or completed drawings and dress form designs with other users via networking. The system 100 can enable positioning of a sharing user in the 3D VR space relative to another user who wishes to view the sharing user's designs. If the sharing user wishes to speak along with draw, the system 100 can provide audio sounds from a portion of the VR space that the sharing user is speaking.

Figure 9:
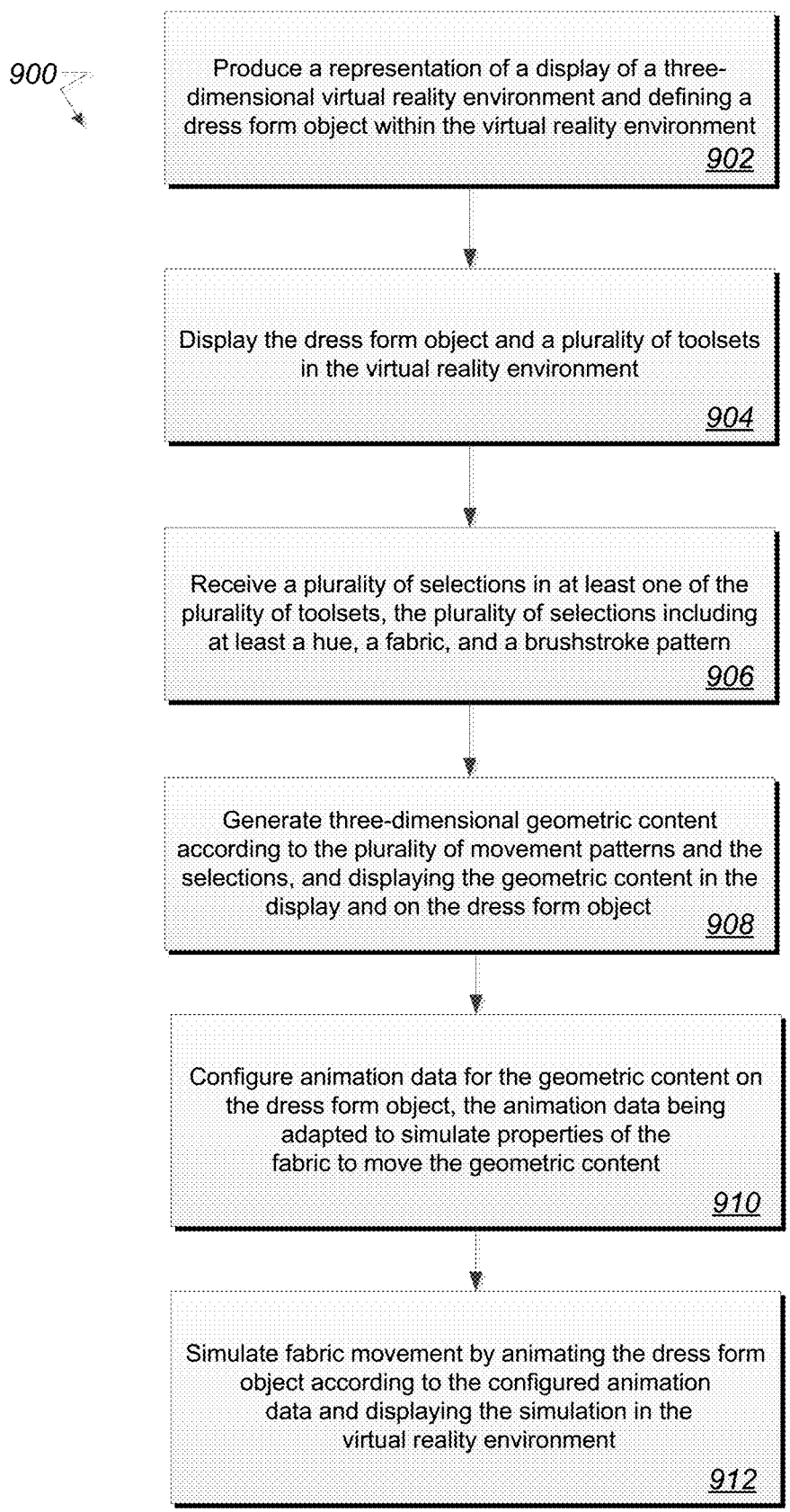
FIG. 9 is a flow chart diagramming one embodiment of a process to provide a virtual reality environment with a dress form object in which a user can generate three-dimensional drawings upon.

FIG. 9 is a flow chart diagramming one embodiment of a process to provide a virtual reality environment with a dress form object in which a user can generate three-dimensional drawings upon.

At block 902, the process 900 can include producing a representation of a display of a three-dimensional virtual reality environment and defining a dress form object within the virtual reality environment. The virtual reality environment may be configured to receive interactive commands from at least one input device coupled to a computing device and associated with a user.

At block 904, the process 900 can include displaying, in the display, the dress form object and a number of toolsets in the virtual reality environment. The toolsets may be configured to generate virtual three-dimensional geometric content on the dress form object. In some implementations, the three-dimensional geometric content includes lines and shapes representing at least a portion of a fashion garment. For example, a single line drawn by a user can be generated a 3D line, shape, or form in the VR space.

At block 906, the process 900 can include receiving a number of selections in at least one of the toolsets. The selections may pertain to user selections and can include one or more of a hue, a fabric, and a brushstroke pattern. In some implementations, the hue, the fabric, and the brushstroke pattern may be used to generate and output the geometric content on the dress form object.

At block 908, the process 900 can include generating three-dimensional geometric content according to the number of movement patterns and the selections. The content may be generated in response to receiving a plurality of movement patterns from an input feed of the at least one input device. The geometric content may be displayed in the display and on the dress form object.

At block 910, the process 900 can include configuring animation data for the geometric content on the dress form object. The animation data may be adapted to simulate properties of the fabric to move the geometric content. The properties of the fabric may include fabric weight, fabric drape, and fabric shear recovery.

At block 912, the process 900 can include simulating fabric movement by animating the dress form object according to the configured animation data and displaying the simulation in the virtual reality environment. The display may be generated in response to receiving an additional movement pattern indicating movement of the dress form object.

In some implementations, the process 900 includes using a three-dimensional drawing plane configured to be a planar drawing guide for receiving drawings. The planar drawing guide may be fitted to a plane of the dress form object, rotatable on at least three axes, and adjustable on the dress form object.

In some implementations, simulating fabric movement also includes obtaining fabric weight information associated with a user-selected fabric and obtaining, from the at least one input device, user movement direction and force associated with the dress form object. In addition, simulating fabric movement may also include moving at least a portion of the fabric at a speed based on the fabric weight and the force. The movement can, for example, be in a first direction in response to determining the dress form object is moving in a second and opposite direction.

In some implementations, the process 900 also includes providing a network interface for multiple computing devices to participate in the virtual reality environment shared by the multiple computing devices. Providing the network interface may includes enabling multiple users each using one or more uniquely identified input devices to collaborate in the virtual reality environment with the dress form object to collaborate modifications to the geometric content.

In some implementations, the process 900 may also include generating a set of selectable dress form objects for use in the virtual reality environment. The dress form objects may be configurable to measurements associated with human anatomy.

Figure 10:
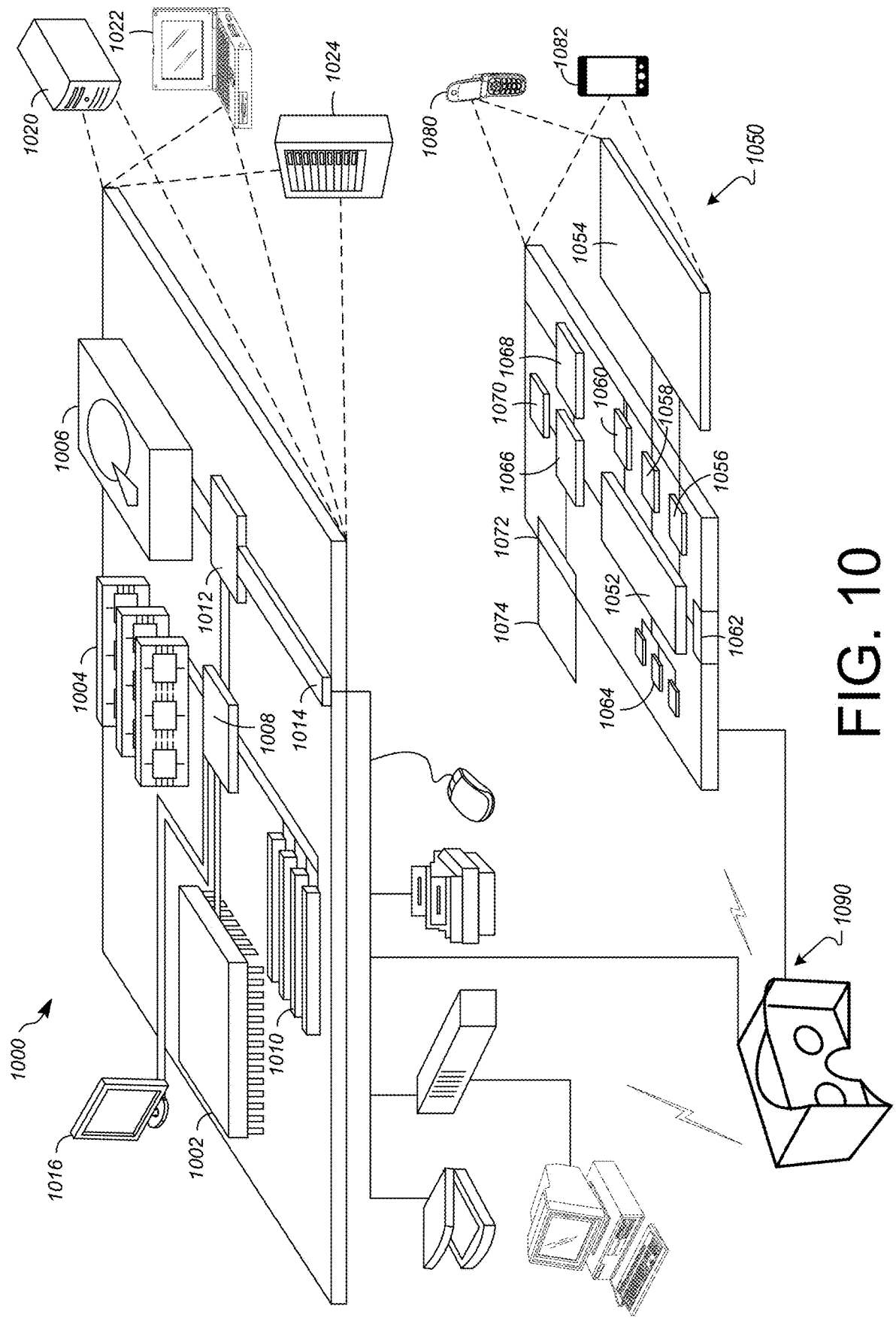
FIG. 10 shows an example of a computer device and a mobile computer device that can be used to implement the techniques described herein.

FIG. 10 shows an example of a generic computer device 1000 and a generic mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control objects in the VR space.

In some implementations, one or more output devices included on the computing device 1050 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR space on the computing device 1050 or on the VR headset 1090.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
   a three-dimensional virtual reality drawing environment executing on at least one processor and defining, with the at least one processor, at least one dress form object for display within the virtual reality drawing environment, the environment configured to receive interactive commands from at least one input device coupled to a computing device;
   a movement tracking module executing on the at least one processor to carry out operations including detecting location information pertaining to a plurality of movements associated with the at least one input device and simulating fabric movement based on a plurality of fabric properties and in response to the plurality of movements; and
   a plurality of three-dimensional tool palettes configured for use in generating drawing content in the virtual reality drawing environment, the tool palettes including at least:
      a plurality of fabric swatches;
      a plurality of drawing patterns; and
      at least one color palette menu represented as a three-dimensional cube including a two-dimensional saturation area including a plurality of hues and a one-dimensional hue area including the plurality of hues that when selected, automatically adjust the two dimensional saturation area to reflect a position of at least one selected hue in the three-dimensional cube.

2. The system of claim 1, wherein simulating fabric movement further includes:
   obtaining fabric weight information associated with a user-selected fabric and obtaining, from the at least one input device, user movement direction and force associated with the dress form object; and
   moving at least a portion of the fabric at a speed based on the fabric weight and the force, the moving being in a first direction in response to determining the dress form object is moving in a second and opposite direction.

3. The system of claim 1, wherein the plurality of fabric properties include fabric weight, fabric drape, and fabric shear recovery.

4. The system of claim 1, wherein the plurality of drawing patterns include fashion garment templates for use in the virtual reality drawing environment.

5. The system of claim 1, further comprising:
   providing a network interface for multiple computing devices to participate in the reality environment shared by the multiple computing devices, wherein providing the network interface includes enabling multiple users each using one or more uniquely identified input devices to collaborate in the reality environment with the dress form object to collaborate modifications to the drawing content.

6. The system of claim 1, wherein a selected hue from the plurality of hues and a brushstroke pattern selected from the at least one toolset are used to generate and output the drawing content on the dress form object according to tracked locations in the reality environment, the tracked locations corresponding to the drawing content that is associated with a plurality of movement patterns generated by the at least one input device.

7. The system of claim 1, wherein a three-dimensional drawing plane is configured to be a planar drawing guide for receiving drawings on a virtual object, the planar drawing guide being fitted to a plane of the virtual object, rotatable on at least three axes, and adjustable on the virtual object.

8. A system comprising:
a three-dimensional augmented reality drawing environment executing on at least one processor and defining a plurality of virtual objects within the environment;
a movement tracking module executing on the at least one processor to carry out operations including detecting location information associated with a plurality of movements that are associated with at least one input device; and
a plurality of three-dimensional tool palettes configured for use in generating drawing content, in the augmented reality drawing environment, at least one color palette menu represented as a three-dimensional cube including a two-dimensional saturation area depicting a plurality of selectable hues, the two-dimensional saturation area including a one-dimensional hue area including the plurality of hues that when selected, automatically adjust the two dimensional saturation area to reflect a position of at least one selected hue in the three-dimensional cube.

9. The system of claim 8, wherein the movement tracking module simulates movement of content drawn in the augmented reality drawing environment according to the plurality of movements associated with the at least one input device.

10. The system of claim 8, wherein the plurality of three-dimensional tool palettes further include a plurality of drawing patterns with templates associated with the virtual object and for use in the augmented reality drawing environment, the virtual object including a dress form object and the plurality of drawing patterns including fashion garment templates for use with the dress form object in the augmented reality drawing environment.

11. The system of claim 8, further comprising:
providing a network interface for multiple computing devices to participate in the augmented reality environment shared by the multiple computing devices, wherein providing the network interface includes enabling multiple users each using one or more uniquely identified input devices to collaborate, in the augmented reality environment, modifications to the drawing content.

12. The system of claim 8, wherein a selected hue from the plurality of hues and a brushstroke pattern selected from the at least one toolset are used to generate and output the drawing content according to tracked locations in the augmented reality environment, the tracked locations corresponding to the drawing content that is associated with a plurality of movement patterns generated from the at least one input device.

13. The system of claim 8, wherein a three-dimensional drawing plane is configured to be a planar drawing guide for receiving drawings on a virtual object, the planar drawing guide being fitted to a plane of the virtual object, rotatable on at least three axes, and adjustable on the virtual object.

14. A computer-implemented method comprising:
producing a representation of a three-dimensional augmented reality environment and defining an object within the augmented reality environment, the augmented reality environment configured to receive interactive commands from at least one input device coupled to a computing device;
triggering rendering of the object and at least one toolset in the augmented reality environment; and
triggering rendering of three-dimensional geometric content on the object responsive to a plurality of detected movement patterns performed by the at least one input device and using at least a portion of the toolset,
wherein the at least one toolset includes at least one color palette menu represented as a three-dimensional object including a two-dimensional saturation area depicting a plurality of hues, the two-dimensional saturation area including a one-dimensional hue area including the plurality of hues that when triggered for selection, automatically adjust the two dimensional saturation area to reflect a position of at least one selected hue in the three-dimensional object.

15. The computer-implemented method of claim 14, wherein the three-dimensional geometric content includes three-dimensional brushstrokes drawn and depicted in real time in three-dimensional space around the object to represent at least a portion of a fashion garment in the augmented reality environment.

16. The computer-implemented method of claim 14, wherein a selected hue from the plurality of hues and a brushstroke pattern selected from the at least one toolset are used to generate and output the geometric content on the object according to tracked locations in the augmented reality environment, the tracked locations corresponding to the geometric content that is associated with the plurality of movement patterns from an input feed of the at least one input device.

17. The computer-implemented method of claim 14, wherein a three-dimensional drawing plane is configured to be a planar drawing guide for receiving drawings, the planar drawing guide being fitted to a plane of the object, rotatable on at least three axes, and adjustable on the object.

18. The computer-implemented method of claim 14, wherein the three-dimensional augmented reality environment is configured to simulate fabric movement on the object by simulating properties of a user-selected fabric represented as a drawing upon the object, the simulated fabric movement based on fabric weight, fabric drape, and fabric shear recovery.

19. The computer-implemented method of claim 18, wherein simulating fabric movement further includes:
obtaining fabric weight information associated with the user-selected fabric and obtaining, from the at least one input device, user movement direction and force associated with the object; and
moving at least a portion of the fabric at a speed based on the fabric weight and the force, the moving being in a first direction in response to determining the object is moving in a second and opposite direction.

20. The computer-implemented method of claim 14, further comprising:
providing a network interface for multiple computing devices to participate in the augmented reality environment shared by the multiple computing devices, wherein providing the network interface includes enabling multiple users each using one or more uniquely identified input devices to collaborate in the augmented reality environment with the object to collaborate modifications to the geometric content.

* * * * *

UNITED STATES PATENT AND TRADEMARK OFFICE
CERTIFICATE OF CORRECTION

PATENT NO. : 10,509,865 B2
APPLICATION NO. : 14/859167
DATED : December 17, 2019
INVENTOR(S) : Hackett et al.

It is certified that error appears in the above-identified patent and that said Letters Patent is hereby corrected as shown below:

In the Claims

In Column 24, Claim 5, Line 50, delete "reality" and insert -- virtual reality --, therefor.

In Column 24, Claim 5, Line 54, delete "reality" and insert -- virtual reality --, therefor.

In Column 24, Claim 6, Line 61, delete "reality" and insert -- virtual reality --, therefor.

Signed and Sealed this
Twenty-sixth Day of May, 2020

Andrei Iancu
*Director of the United States Patent and Trademark Office*